United States Patent
Voirin et al.

(10) Patent No.: US 12,515,581 B2
(45) Date of Patent: *Jan. 6, 2026

(54) DEVICE AND METHOD FOR CONTROLLING MATRIX LIGHT SOURCES

(71) Applicant: VALEO VISION, Bobigny (FR)

(72) Inventors: Patrice Voirin, Bobigny (FR); Feng Yang, Bobigny (FR); Eric Donnat, Bobigny (FR); Houssem Kouki, Bobigny (FR); Rodrigo Carbonell, Bobigny (FR)

(73) Assignee: Valeo Vision, Bobigny (FR)

( * ) Notice: Subject to any disclaimer, the term of this patent is extended or adjusted under 35 U.S.C. 154(b) by 431 days.

This patent is subject to a terminal disclaimer.

(21) Appl. No.: 17/762,523

(22) PCT Filed: Sep. 24, 2020

(86) PCT No.: PCT/EP2020/076636
§ 371 (c)(1),
(2) Date: Oct. 17, 2022

(87) PCT Pub. No.: WO2021/058608
PCT Pub. Date: Apr. 1, 2021

(65) Prior Publication Data
US 2023/0039847 A1 Feb. 9, 2023

(30) Foreign Application Priority Data

Sep. 27, 2019 (FR) ...................................... 1910733

(51) Int. Cl.
*B60Q 1/14* (2006.01)
*B60Q 11/00* (2006.01)
*H05B 45/14* (2020.01)

(52) U.S. Cl.
CPC .......... *B60Q 1/1423* (2013.01); *B60Q 11/005* (2013.01); *H05B 45/14* (2020.01)

(58) Field of Classification Search
CPC . B60Q 9/00; B60Q 1/52; B60Q 1/507; B60Q 1/544; B60Q 1/525; B60Q 1/143; B60Q 5/006
See application file for complete search history.

(56) References Cited

U.S. PATENT DOCUMENTS 6,969,183 B2 11/2005 Okubo et al.
9,913,344 B2 3/2018 Lu et al.
(Continued)

FOREIGN PATENT DOCUMENTS

CN 109668109 A 4/2019
DE 102010031242 A1 9/2011
(Continued)

OTHER PUBLICATIONS

European Patent Office, International Search Report (with English translation) and Written Opinion of corresponding International Application No. PCT/EP2020/076636, dated Nov. 16, 2020.
(Continued)

*Primary Examiner* — Wei (Victor) Y Chan
(74) *Attorney, Agent, or Firm* — Valeo Vision

(57) ABSTRACT

Lighting module for a motor vehicle comprising a matrix light source grouping together a plurality of elementary light sources, and a control module for a motor vehicle. Method for controlling the matrix source of said module, noteworthy in that it allows a default lighting setpoint to be generated.

15 Claims, 2 Drawing Sheets

(56) References Cited

U.S. PATENT DOCUMENTS

| | | | |
|---|---|---|---|
| 10,837,613 | B2 | 11/2020 | Pellarin et al. |
| 2006/0193133 | A1 | 8/2006 | Von Der Brelie |
| 2013/0193878 | A1 | 8/2013 | Zimmermann |
| 2014/0232265 | A1* | 8/2014 | Masuda ............... B60Q 1/08 315/82 |
| 2017/0086270 | A1* | 3/2017 | Büthker ............ H05B 45/48 |
| 2017/0135165 | A1* | 5/2017 | Lu ................ H05B 47/155 |
| 2017/0253336 | A1* | 9/2017 | Matsui ............... H05B 45/22 |
| 2019/0116345 | A1 | 4/2019 | Albou et al. |
| 2019/0197934 | A1 | 6/2019 | El Idrissi et al. |
| 2019/0200427 | A1 | 6/2019 | Albou et al. |
| 2019/0264885 | A1 | 8/2019 | Lefaudeux et al. |
| 2019/0268071 | A1 | 8/2019 | Lydecker et al. |
| 2020/0215963 | A1* | 7/2020 | Lahmer ............ B60Q 1/1407 |
| 2020/0398736 | A1* | 12/2020 | Kim .................. B60Q 1/08 |

FOREIGN PATENT DOCUMENTS

| | | | |
|---|---|---|---|
| DE | 102017211699 | A1 | 1/2019 |
| EP | 2676527 | B1 | 10/2017 |
| EP | 3501895 | A1 | 6/2019 |
| FR | 3019266 | A1 | 10/2015 |
| FR | 3055980 | A1 | 3/2018 |
| FR | 3072531 | A1 | 4/2019 |
| JP | 2004-214023 | A | 7/2004 |
| JP | 2005-170372 | A | 6/2005 |
| JP | 2006-088922 | A | 4/2006 |
| JP | 2014-094589 | A | 5/2014 |
| JP | 2019-142474 | A | 8/2019 |

OTHER PUBLICATIONS

Japanese Patent Office, Office Action (with English translation) of corresponding Japanese Application No. 2022-519241, dated Apr. 28, 2023.

Japanese Patent Office, Search Report (with English translation) of corresponding Japanese Application No. 2022-519241, dated Apr. 28, 2023.

Japanese Patent Office, Written Opinion (with English translation) of corresponding Japanese Application No. 2022-519241, dated Jul. 14, 2023.

The China National Intellectual Property Administration (CNIPA), Office Action of corresponding Chinese Application No. 2020800681213, dated Jun. 28, 2024.

* cited by examiner

300

> Transmit, by the control unit, at least some of the calibration data stored in the memory element to the control module for the motor vehicle.
> 310

> Determine a lighting setpoint with a control module for the motor vehicle.
> 320
>
> > Transmit the lighting setpoint to the control unit for the lighting module by the control module.
> > 322
>
> > Correct, by the control module, the lighting setpoint by using the received calibration data, and transmitting a corrected lighting setpoint to the control unit for the lighting module.
> > 324

> Control, by the control unit for the lighting module with a communication channel to the control module, the matrix light source of the lighting module according to the lighting setpoint and to the calibration data stored in a memory element of the lighting module.
> 330
>
> > Receive and correct, by the control unit, the lighting setpoint by using the calibration data stored in the memory element.
> > 332
>
> > At least some of the data exchanged between the control module for the motor vehicle and the control unit for the lighting module is encrypted or signed by means of at least one cryptographic key.
> > 334
> >
> > > A failure at the lighting module and/or at the control module for the motor vehicle is detected when decryption of the data is unsuccessful or when said a signature cannot be validated.
> > > 335

Fig. 3

DEVICE AND METHOD FOR CONTROLLING MATRIX LIGHT SOURCES

CROSS-REFERENCE TO RELATED APPLICATIONS

This application is filed under 35 U.S.C. § 371 U.S. National Phase of International Application No. PCT/EP2020/076636 filed Sep. 24, 2020 (published as WO2021058608), which claims priority benefit to French application No. 1910733 filed on Sep. 27, 2019, the disclosures of which are herein incorporated by reference in their entirety.

TECHNICAL FIELD

The invention relates to lighting modules for motor vehicles. In particular, the invention relates to such modules involving matrix light sources.

BACKGROUND OF THE INVENTION

A light-emitting diode (LED) is a semiconductor electronic component capable of emitting light when it is subjected to an electric current having at least one threshold intensity. In the automotive field, LED technology is increasingly being used for numerous light signaling solutions. LED matrices are of particular interest in the field of automotive lighting. Matrix light sources can be used for "leveling"-type functions, i.e. adjusting the height of the emitted light beam according to the attitude of the vehicle and the profile of the road. Other applications include DBL ("digital bending light") which corresponds to adjusting the direction of the emitted light beam in order to follow the road in the horizontal plane, ADB ("adaptive driving beam") which corresponds to an anti-dazzle function that generates shaded areas in the light beam emitted by a high beam so as not to disrupt other road users, as well as functions for projecting patterns on the ground using the pixelated light beam.

BRIEF SUMMARY OF THE INVENTION

It is known practice to use light sources with different types of technology for the aforementioned lighting applications. This may include, for example, monolithic technology, according to which a large plurality of LED-type elementary sources, equivalent to pixels, are etched into a common semiconductor substrate. Integrated electrical connections allow the pixels to be activated independently of one another. Another known technology is that of microLEDs, which produces a matrix of LEDs of small size, typically smaller than 150 µm. There are also modules of micromirror, or DMD ("digital micromirror device"), type, which involve a projection technology using an intensity modulator on a uniform beam. Micromirrors, the position of which is controlled by means of piezoelectric elements, are oriented so as to selectively reflect an incident light beam, so that each micromirror corresponds to an elementary source of the pixel matrix thus produced. The light from a source is directed onto the matrix of micromirrors by an optic. This light therefore has a variable distribution from one module to another because of positioning and manufacturing tolerances in the optics and in the light source. This causes a variable maximum intensity from one module to another, for a given pixel. In this case, each pixel will have a different maximum intensity depending on the command transmitted thereto. Such lighting devices are designed using mass production methods. There has to be a certain amount of play between the constituent elements of the lighting and/or signaling device on the one hand to allow easy assembly, and on the other hand because the parts are generally not machined but instead molded in plastic, which allows the production cost to be kept down.

It is worth emphasizing, in particular, the difficulty in perfectly aligning a micromirror matrix with the optical projection portion, which generally comprises at least one lens. Due to the high numerical aperture of the lens used for the projection function, the projection quality of the image decreases significantly if the lateral offset from the optical axis reaches a few micrometers. In practice, distortions of the projected image are therefore inevitable using solutions known in the prior art. Each projection module of this type has its own set of optical characteristics, in particular geometric aberration characteristics, including optical distortion and spherical aberration properties. During the production of micromirrors, geometric aberrations may be introduced. All of these elements result in non-uniform behavior of the matrix light source.

All of these aforementioned modules have their own characteristics related to the combination of the manufacturing tolerances of the components. During the production of semiconductor components such as LEDs or LED matrices, direct current variations are currently unavoidable. As a result, in a given LED matrix for the same load current, the LEDs emit light beams with variable, non-uniform intensities.

One aim of the invention is to overcome at least one of the problems posed by the prior art. More precisely, the object of the invention is to propose a lighting module and a control method that make it possible to calibrate the luminous and/or geometric behavior of the elementary light sources that are grouped together in a matrix light source of a motor vehicle. The aim is to provide the means for producing a uniform light beam that conforms to a predetermined setpoint, independently of the instance of the matrix light source installed in the lighting module.

According to a first aspect of the invention, a lighting module for a motor vehicle is proposed. The lighting module comprises a matrix light source grouping together a plurality of elementary light sources, a data reception unit for receiving a lighting setpoint, and a control unit intended to control said matrix light source according to said lighting setpoint. The lighting module is noteworthy in that it comprises a memory element to which the control unit has read access, and in which calibration data specific to each of the elementary light sources are stored.

The reception unit may preferably comprise a network interface capable of receiving data over a data bus internal to the motor vehicle. For example, the bus may be an Ethernet bus, a bus of gigabit multimedia serial link, GMSL, type, or a bus using low-voltage differential signaling, LVDS, technology, such as an FPD-Link III bus.

The control unit may preferably comprise a microcontroller element. The control unit may preferably comprise a chip of field-programmable gate array, FPGA, application-specific integrated circuit, ASIC, or complex programmable logic device, CPLD, type. These elements are configured using an appropriate computer program to implement the described functionalities.

The matrix light source may preferably comprise a monolithic source, comprising elementary light-emitting light sources with semiconductor elements that are etched into a common substrate and are activatable independently of one another.

The matrix light source may preferably comprise a microLED-type matrix, comprising a matrix of elementary sources produced by light-emitting diodes, LEDs, of small size, typically smaller than 150 μm.

The matrix light source may preferably comprise a micromirror device, DMD, (digital micromirror device), in which an elementary source comprises a micromirror in a matrix, which selectively reflects an incident light beam according to its position.

Preferably, said lighting setpoint may comprise an elementary setpoint per elementary light source.

Said lighting setpoint may preferably comprise an image. Preferably, at least one pixel of the image may correspond to an elementary light source. The resolution of the image may preferably be higher than the projection resolution of the matrix light source. Preferably, a pixel of the image may correspond to an elementary light source.

Preferably, the calibration data may comprise, for each elementary source, an indication of the light intensity emitted as a function of an electric load current.

Preferably, the calibration data may comprise an indication of a geometric aberration of a light beam that the module is capable of emitting.

The control unit may preferably be configured to control said matrix light source by correcting said lighting setpoint by means of at least some of said calibration data.

Preferably, the control unit may be configured to transmit at least some of said calibration data to a control module for the motor vehicle.

The lighting module may preferably comprise a second memory element in which data allowing the module to be authenticated are stored. Preferably, the lighting module may comprise a processor programmed to encrypt and/or sign data by means of a cryptographic key stored in said memory element.

According to another aspect of the invention, a lighting device for a motor vehicle is proposed. The device is noteworthy in that it comprises at least one light module according to the preceding aspect of the invention.

According to another aspect of the invention, a method for controlling a matrix light source of a lighting module for a motor vehicle is proposed. The lighting module is in accordance with one aspect of the invention. The method can include determining a lighting setpoint with a control module for the motor vehicle and controlling, by the control unit for the lighting module with a communication channel to the control module, the matrix light source of the lighting module according to the lighting setpoint and to the calibration data stored in a memory element of the lighting module.

The method can further include transmitting the lighting setpoint to the control unit for the lighting module by the control module and receiving, by the control unit, the lighting setpoint and correcting the setpoint by using the calibration data stored in the memory element.

Preferably, said calibration data may comprise a light intensity value for each of the elementary light sources.

The method can additionally include transmitting, by the control unit, at least some of the calibration data stored in the memory element to the control module for the motor vehicle and correcting, by the control module, the lighting setpoint by using the received calibration data, and transmitting a corrected lighting setpoint to the control unit for the lighting module.

Preferably, the at least some of the calibration data transmitted to the control module for the motor vehicle may comprise data indicating a geometric aberration.

The control method may preferably comprise a step of generating a default lighting setpoint, determined by using said calibration data as well as data relating to the motor vehicle, and a step of storing the default lighting setpoint in a memory element of the lighting module.

Preferably, said default lighting setpoint may be generated by the control module for the motor vehicle following the reception of said calibration data from the control unit for the lighting module. The setpoint may then preferably be transmitted to said control unit which stores it in a memory element.

The default setpoint may preferably replace the lighting setpoint received in step a) if a failure at the lighting module and/or at the control module for the motor vehicle is detected.

Preferably, at least some of the data exchanged between the control module for the motor vehicle and the control unit for the lighting module may be encrypted and/or signed by means of at least one cryptographic key.

Preferably, a failure at the lighting module and/or at the control module for the motor vehicle may be detected when the decryption of the data is unsuccessful or when said signature cannot be validated.

According to another aspect of the invention, a method for pairing a lighting module for a motor vehicle, in accordance with one aspect of the invention, and a control module for a motor vehicle is proposed. The method is noteworthy in that it includes:
  at the control unit for the lighting module, transmitting the calibration data stored in the memory element to the control module for the motor vehicle;
  at the control module, by using data relating to the motor vehicle, such as, for example, the attitude, the position of the lighting module, or the position of other lighting modules, generating a default lighting setpoint and transmitting it to the control unit for the lighting module;
  at the control unit for the lighting module, saving the default setpoint in a memory element.

Preferably, the default setpoint may comprise an image corresponding to low-beam headlight illumination. Preferably, the default setpoint may comprise a low-beam headlight cut-off.

According to another aspect of the invention, a computer program comprising a sequence of instructions is proposed. When the instructions are executed by a processor, they result in the processor implementing the method according to one of the aspects of the invention.

According to a final aspect of the invention, a non-transitory computer-readable storage medium is proposed. The medium stores a computer program according to one aspect of the invention.

By using the measures proposed by the present invention, it becomes possible to provide a lighting module and a control method that make it possible to calibrate the luminous and/or geometric behavior of the elementary light sources that are grouped together in a matrix light source of a lighting module of a motor vehicle. The aspects of the invention make it possible to produce a uniform light beam that conforms to a predetermined setpoint, independently of the instance of the matrix light source installed in the lighting module. To achieve this, in accordance with aspects of the invention, it is proposed that the calibration parameters be stored in a memory attached to the lighting module, said parameters comprising, for example, electric current or brightness correction values for each pixel of a matrix source, or geometry corrections for the beam produced by the light module. In this way, it is ensured that the data associated with the module are physically attached thereto, in particular when pairing the lighting module with the motor vehicle. This makes it possible to avoid an additional step of parameterization which might give rise to errors when assembling a vehicle headlamp using the lighting module. By using the measures of the invention, a module may be assembled or changed without software manipulation: for example, there is no need to transfer or update data relating to the module in a memory of the controller for the motor vehicle.

BRIEF DESCRIPTION OF THE DRAWINGS

Other features and advantages of the present invention will be better understood with the aid of the description of the examples and of the drawings, in which:

FIG. 3 shows a method for controlling a matrix light source according to one preferred embodiment of the invention.

DETAILED DESCRIPTION OF THE INVENTION

Figure 1:
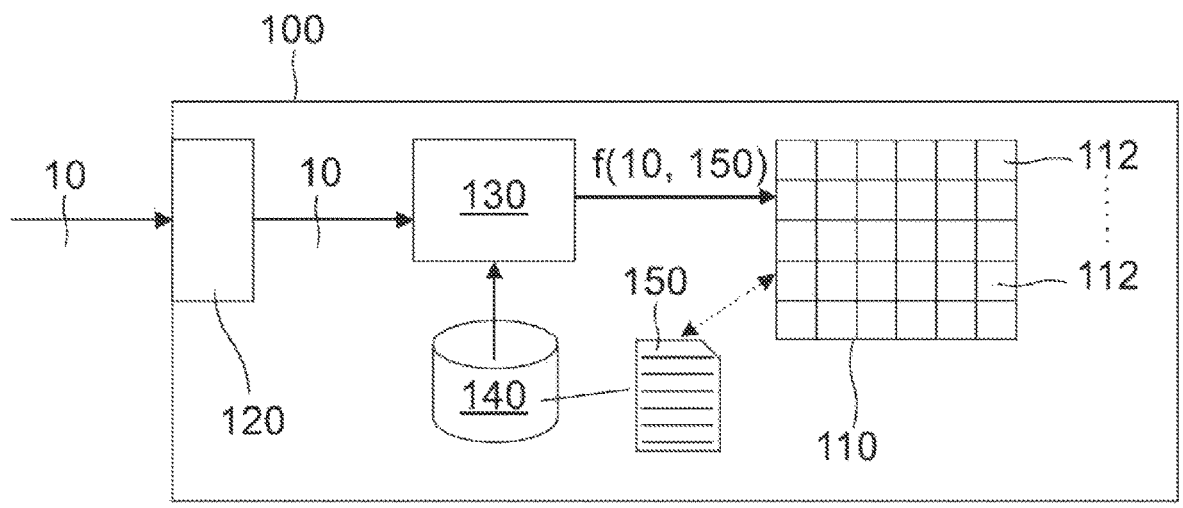
FIG. 1 is an illustration of a light module in accordance with one preferred embodiment of the invention.

Unless specified otherwise, technical features that are described in detail for one given embodiment may be combined with the technical features that are described in the context of other embodiments described by way of example and without limitation. Similar reference numerals will be used to describe similar concepts across various embodiments of the invention. For example, the references 100 and 200 denote two embodiments of a lighting module according to the invention.

The description focuses on the elements of a lighting module for a motor vehicle that are required to understand the invention. Other elements, which in a known manner form part of such modules, will not be mentioned or described in detail. For example, the presence and operation of a converter circuit involved in supplying power to a matrix light source, known per se, will not be described in detail. The same applies for optical elements such as lenses, for example.

FIG. 1 shows a lighting module 100 for a motor vehicle according to a first embodiment. The module comprises a matrix light source 110 grouping together a plurality of elementary light sources 112. In the example illustrated, this is a matrix of LEDs without, however, the invention being limited to this example. The matrix light source may also be produced by a micromirror device, for which each mirror is designed to generate one elementary light beam of a matrix. The module comprises a data reception unit 120; this is, for example, an interface capable of receiving and decoding messages over a data bus internal to the motor vehicle, such as a CAN (Controller Area Network) bus. The data reception unit 120 is capable of receiving a lighting setpoint 10, typically determined by a control module (not shown) for the motor vehicle. The lighting setpoint may, for example, comprise a brightness value, such as a grayscale level, encoded on a predetermined number of bits, to be produced by each of the elementary light sources 112. The lighting setpoint may therefore be a digital image, and it may in particular be a frame from a stream of such images, constituting a video signal. A control unit 130 is intended to control said matrix light source according to said lighting setpoint. The control unit may be connected to, or comprise, a circuit for driving the electrical power supply for the elementary light sources 112, which is controlled in order to supply the elementary light sources with power in such a way as to implement the setpoint 10. The module 100 further comprises a memory element 140, such as a flash-type memory, to which the control unit 130 is functionally connected and has read access, and in which calibration data 150 specific to each of the elementary light sources 112 are stored. By way of example, the data may comprise, for each elementary light source 112, a value indicating the difference in brightness with respect to the average brightness of the matrix source 110, possibly over a range of load current strengths. In order to ensure uniform light intensity, the control unit 130 adjusts the received setpoint values 10 by adding thereto or subtracting therefrom the respective differences before controlling the elementary light sources in accordance with the result. The data 150 may nevertheless comprise more complex optical or geometric calibration parameters, without thereby departing from the scope of the present invention. In such a case, instead of acting only at the level of each light source or at the level of each pixel individually, the correction of the setpoint 10 may advantageously produce a correction at the level of the entire setpoint, i.e. at the level of the entire image to be projected, or at the level of at least a portion or a region of this image. For example, the image projected without the setpoint correction might exhibit a concave curved appearance due to the projection optics in the vicinity of the projection region. Producing the precorrected setpoint, which takes into account the calibration data including the geometric deformation imposed by the projection optics, results in a projected image exhibiting a geometry closer to the desired, non-curved geometry. To apply a correction for geometric aberrations, a deformation is applied to the entire setpoint image 10. As this is discretized, this deformation causes degradation of the information contained in the initial image. It is therefore advantageous for the reference image transmitted from the control unit for the vehicle to the control unit to have a resolution higher than the projection resolution of the light module. The control unit 130 comprises a microcontroller element that has sufficient computing power to correct the setpoint 10, or a stream of setpoints, in real time, by applying the calibration data 150 thereto.

Figure 2:
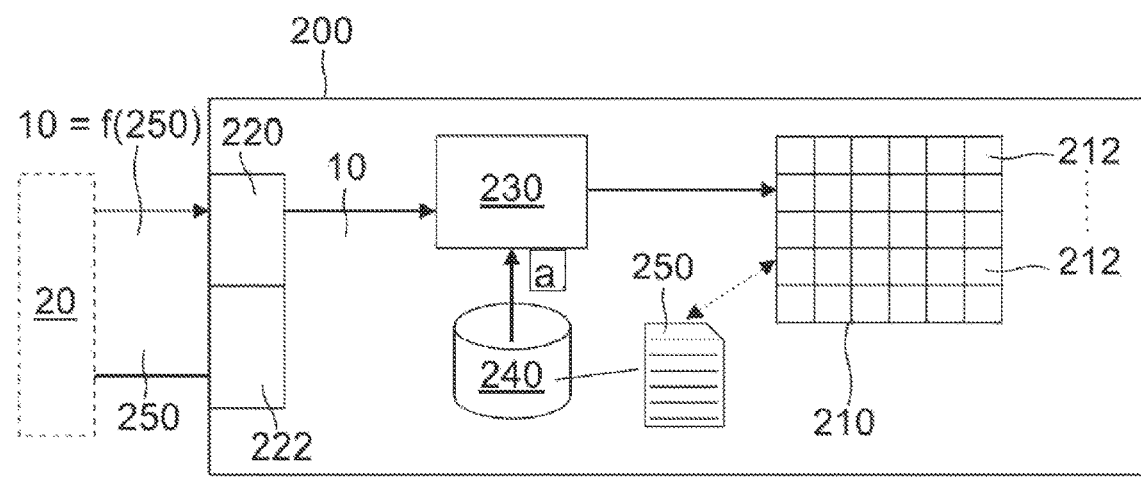
FIG. 2 is an illustration of a light module in accordance with one preferred embodiment of the invention.

FIG. 2 shows a lighting module 200 for a motor vehicle according to a second embodiment. The module comprises a matrix light source 210 grouping together a plurality of elementary light sources 212. The module comprises a data reception/transmission unit 220, 222. The data reception unit 220 is capable of receiving a lighting setpoint 10, typically determined by a control module 20 for the motor vehicle. The lighting setpoint may, for example, comprise a brightness value, such as a grayscale level, encoded on a predetermined number of bits, to be produced by each of the elementary light sources 212. A control unit 230 is intended to control said matrix light source according to said lighting setpoint. The module 200 further comprises a memory element 240, such as a flash-type memory, to which the control unit 230 is functionally connected and has read access, and in which calibration data 250 described in the context of the preceding embodiment and specific to each of the elementary light sources 212 are stored. By way of example, the data may comprise, for each elementary light source 212, a value indicating the difference in brightness with respect to the average brightness of the matrix source 210, possibly over a range of load current strengths. The lighting module illustrated is arranged so as to transmit at least some the calibration data 250, and preferably all of this data, to the control module 20. This is, for example, performed in a phase of initializing the lighting module. In order to guarantee uniform light intensity, the control module 20 takes into account the calibration values 250 thus received in order to determine the setpoint image 10. For example, the control module 20 adjusts the setpoint values 10 by adding or subtracting the respective differences before transmitting the result to the lighting module 200. The data 250 may nevertheless comprise more complex optical or geometric calibration parameters, without thereby departing from the scope of the present invention. In this embodiment, the control unit 230 is freed from the task of correcting the setpoint, and it may be performed by a less expensive microcontroller element that has less computing power.

The exchange of data between the light module 200 and the control module 20 for the motor vehicle after pairing the two modules allows other advantageous applications. In particular, it is proposed to combine data relating to the vehicle, such as, for example, orientation, position, or attitude parameters of the vehicle, or information relating to luminous fluxes emitted by other headlights of the vehicle, which are a priori only available at the control module 20, with the calibration data 250, available at the lighting module 200 and specific to the matrix source 210 installed therein. This information is used, typically but in a non-limiting manner, by the control module 20 for the motor vehicle to generate a default image or setpoint. Specifically, the control module for the motor vehicle generally has greater computing capacity than the control unit 230 for the lighting module. Alternatively, this computation may be performed by the control unit 230 for the lighting module after a corresponding exchange of the data required for this computation between the control unit for the motor vehicle on the one hand and the control unit for the lighting module on the other hand. A default image is an image that is projected by the module when a fault or failure is detected. Thus, the module may preferably comprise an electronic error detection circuit, or a microprocessor programmed for this purpose by a suitable computer program. The error detection circuit is configured to detect, for example, that the data received by the control module for the motor vehicle are inconsistent, or that the connection between the control module for the motor vehicle and the lighting module 200 is no longer reliable. Following this detection of an error, the default image is projected instead of the setpoint image, with the aim of avoiding potential dazzling of other road users. The default image is generated to take into account the specificities of the matrix light source 210 on the one hand, and of the vehicle equipped therewith on the other hand. Thus, the default image may, for example, be generated precisely and automatically for each motor vehicle and each lighting module with which the vehicle is equipped. Preferably, the default image resulting from this method is transmitted to the lighting module, which stores it permanently in a dedicated memory element. In the event of communication failure between the control module 20 for the motor vehicle and the lighting module 200, the default setpoint then serves as a control for the matrix light source. The default setpoint or image may, for example, correspond to low-beam headlight illumination. In particular, this image may correspond to a low-beam headlight cut-off. Specifically, the cut-off must be well defined in order to satisfy the regulations in force.

The exchange of data between the control module 20 for the motor vehicle and the lighting module 200 as defined above and also allows an authentication function to be added between the two modules 20 and 200, respectively.

It should be noted that this authentication function may also be implemented independently of the calibration function and/or of the exchange of calibration/attitude data and without the presence of the memory element 240 at the lighting module 200.

The authentication function may, for example, comprise the exchange of public cryptographic keys between the two modules in question, thus allowing the reciprocal verification of the authenticity of data signed by means of the corresponding private cryptographic keys. Alternatively or in addition, the control unit 230 for the lighting module 200 sends an acknowledgement of receipt to the control module 20 for a received data packet, the acknowledgement of receipt comprising a part that allows the microcontroller to be authenticated. The data packet may, for example, contain calibration data, and/or default image data and/or data for generating a default image and/or all or part of an image and/or of a group of images, and/or a packet from a compressed video stream. In one preferred embodiment, this authentication is not performed on all of the packets. In this way, the corresponding computing load is lightened and smoothed out over time. Still alternatively, the authentication function may comprise sending, from the control module 20 for the motor vehicle to the control unit 230 for the lighting module, of a header for a sent data packet, the header comprising a part allowing the control module 20 to be authenticated, the data packet being of the same type as defined above. Advantageously, this authentication is not performed on all of the packets. In this way, the corresponding computing load is lightened and smoothed out over time.

In order to perform the authentication function, the lighting module 200 and the control module 20 for the motor vehicle comprise computing means for generating the header or the acknowledgement of receipt used for authentication, respectively. Preferably, generation is performed according to a time or a date, which may be expressed in any unit of time, for example in milliseconds, or a counter counting exchanges or computing cycles, or another element that changes with the number of exchanges, which may be reset when it exceeds a predefined size.

In the event that authentication between the controller and the microcontroller fails, the lighting function may be put into a communication failure mode. Advantageously, the failure mode is activated only in the event of repeated authentication failures, which makes it possible to avoid activating failure mode if the link has been disrupted, for example by transient electromagnetic interference, which is particularly advantageous in the case of an authentication function using headers or acknowledgements of receipt.

In the case where the control unit 230 comprises a computer, it may implement a data exchange encryption function, in which data encrypted by the control module 20 for the motor vehicle are decrypted by the computer. Advantageously, the computer has a method for determining if the stream has not been decoded correctly. If the stream has not been decoded correctly, the computer may go into a communication failure mode. The communication failure mode may involve the following procedures, taken alone or in combination:

stopping the lighting function or the lighting module projecting a default image, the control module 20 generating a failure signal sent to a central management system of the vehicle, the computer entering an authentication mode in which the computer continues launching an authentication procedure with respect to the computer for the control module 20 (or vice versa). In the authentication mode, the sending of data packets may be interrupted.

FIG. 3 shows a method 300 for controlling a matrix light source according to one embodiment of the invention. In block 310, at least some of the calibration data stored in a memory element is transmitted from the lighting module to the control module for the motor vehicle. In block 320, the lighting setpoint is determined by the control module for the motor vehicle and transmitted to the lighting module. In block 322, the lighting setpoint is transmitted to the control unit by the control module. In block 324, the lighting setpoint is corrected, by the control module, by using the received calibration data, and transmitting a corrected lighting setpoint to the control unit for the lighting module. In block 330, the control unit controls the matrix light source 1 while correcting the setpoint using the calibration data stored in the memory element. In block 332, the lighting setpoint is received and corrected, by the control unit, using the calibration data stored in the memory element. In block 334, at least some of the data exchanged between the control module for the motor vehicle and the control unit for the lighting module is encrypted or signed by means of at least one cryptographic key. In block 335, a failure at the lighting module and/or at the control module for the motor vehicle is detected when decryption of the data is unsuccessful or when said a signature cannot be validated.

It goes without saying that the described embodiments do not limit the scope of protection of the invention. By referring to the description that has just been given, other embodiments may be contemplated without otherwise departing from the scope of the present invention.

The scope of protection is defined by the claims.

What is claimed is:

1. A lighting module for a motor vehicle, comprising:
a matrix light source with a plurality of elementary light sources, a data reception unit for receiving a lighting setpoint, a control unit intended to control the matrix light source according to the lighting setpoint, a first memory element to which the control unit has read access, and in which calibration data specific to each of the elementary light sources is stored, with the control unit being configured to transmit and receive at least some of the calibration data to a control module for the motor vehicle outside of the light module.

2. The lighting module as claimed in claim 1, wherein the lighting setpoint comprises an elementary setpoint per elementary light source.

3. The lighting module as claimed in claim 1, wherein the lighting setpoint includes an image, of which at least one pixel corresponds to an elementary light source.

4. The lighting module as claimed in claim 1, wherein the calibration data includes, for each elementary light source, an indication of the light intensity emitted as a function of an electric load current or an indication of a geometric aberration of a light beam that the elementary light source is capable of emitting.

5. The lighting module as claimed in claim 1, wherein the control unit is configured to control the matrix light source by correcting the lighting setpoint by means of at least some of the calibration data.

6. The lighting module as claimed in claim 1, wherein the lighting module further incudes a second memory element in which data allowing the lighting module to be authenticated is stored.

7. A method for controlling a matrix light source of a lighting module for a motor vehicle, the method comprises:
determining a lighting setpoint with a control module for the motor vehicle outside of the lighting module, the control module being configured to transmit and receive at least some calibration data to the control unit; and
controlling, by the control unit for the lighting module with a communication channel to the control module, the matrix light source of the lighting module according to the lighting setpoint and to the calibration data stored in a memory element of the lighting module.

8. The method as claimed in claim 7, further comprising:
transmitting the lighting setpoint to the control unit for the lighting module by the control module; and
receiving, by the control unit, the lighting setpoint and correcting the setpoint by using the calibration data stored in the memory element.

9. The method as claimed in claim 7, further comprising:
transmitting, by the control unit, at least some of the calibration data stored in the memory element to the control module for the motor vehicle; and
correcting, by the control module, the lighting setpoint by using the received calibration data, and transmitting a corrected lighting setpoint to the control unit for the lighting module.

10. The method as claimed in claim 7, further comprising generating a default lighting setpoint, determined by using the calibration data and motor vehicle data, and storing the default lighting setpoint in the memory element of the lighting module.

11. The method as claimed in claim 10, wherein the default lighting setpoint is generated by the control module for the motor vehicle following the reception of the calibration data from the control unit for the lighting module, and in that the default setpoint is then transmitted to the control unit which stores the default setpoint in the memory element.

12. The method as claimed in claim 10, wherein the default lighting setpoint replaces the lighting setpoint if a failure is detected in the lighting module or the control module for the motor vehicle.

13. The method as claimed in claim 7, wherein at least some of the data exchanged between the control module for the motor vehicle and the control unit for the lighting module is encrypted or signed by means of at least one cryptographic key.

14. The method as claimed in claim 13, wherein a failure at the lighting module or at the control module for the motor vehicle is detected when decryption of the data is unsuccessful or when a signature cannot be validated.

15. A lighting module for a motor vehicle, comprising:
a matrix light source with a plurality of elementary light sources, a data reception unit for receiving a lighting setpoint, a control unit intended to control the matrix light source according to the lighting setpoint, a first memory element to which the control unit has read access, and in which calibration data specific to each of the elementary light sources is stored, with the control unit being configured to transmit at least some of the calibration data to a control module for the motor vehicle outside of the light module, with the calibration data including, for each elementary source, an indication of the light intensity emitted as a function of an electric load current.

\* \* \* \* \*